United States Patent [19]

Moritomo

[11] Patent Number: 5,581,728

[45] Date of Patent: Dec. 3, 1996

[54] INFORMATION STORAGE SYSTEM HAVING ADVANCE READING FUNCTION

[75] Inventor: Ichiro Moritomo, Sagamihara, Japan

[73] Assignee: Ricoh Company, Ltd., Tokyo, Japan

[21] Appl. No.: 262,527

[22] Filed: Jun. 20, 1994

[30] Foreign Application Priority Data

Jun. 20, 1993 [JP] Japan .................................. 5-173741

[51] Int. Cl.⁶ .................................................. G06F 13/00
[52] U.S. Cl. .................... 395/464; 395/421.03; 395/474; 395/840; 395/841; 395/876; 364/DIG. 1
[58] Field of Search ...................... 364/DIG. 1, DIG. 2; 395/775, 464, 421.03, 474, 840, 841, 876

[56] References Cited

U.S. PATENT DOCUMENTS 4,371,927  2/1983  Wilhite et al. .......................... 364/200
5,371,870  12/1994  Goodwin et al. ........................ 395/425

*Primary Examiner*—Frank J. Asta
*Attorney, Agent, or Firm*—Cooper & Dunham LLP

[57] ABSTRACT

A reading unit reads first data blocks among the data blocks stored in an information storage medium according to the information specified by a mother system. A buffering unit temporarily stores the first data blocks read by the reading unit. A transferring unit transfers the first data blocks temporarily stored by the buffering unit to the mother system. A advancing unit causes the reading unit to read in advance second data blocks subsequent to the first data blocks in the information storage medium, the unit then causing the buffer unit to store the second data blocks. A controlling unit controls the advancing unit appropriately according to the information specified by the mother system.

8 Claims, 5 Drawing Sheets

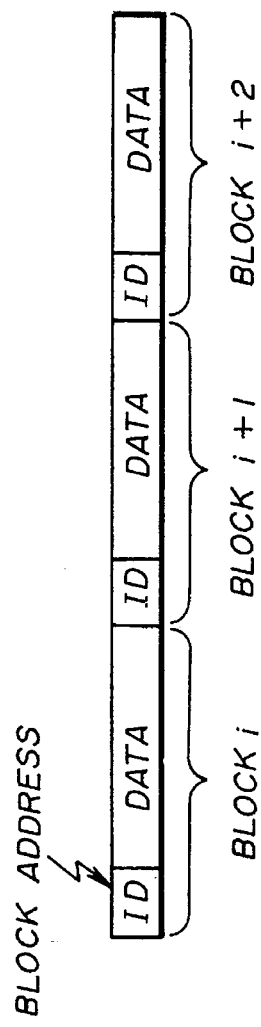
FIG. I
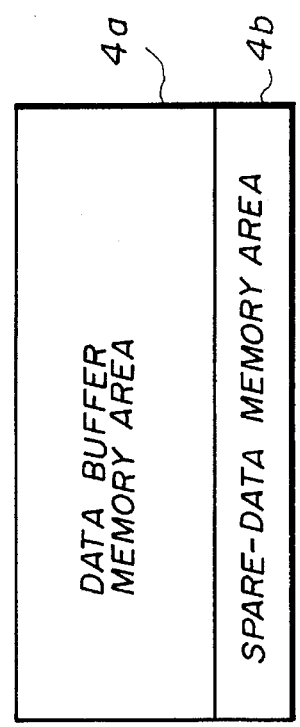
FIG. 3

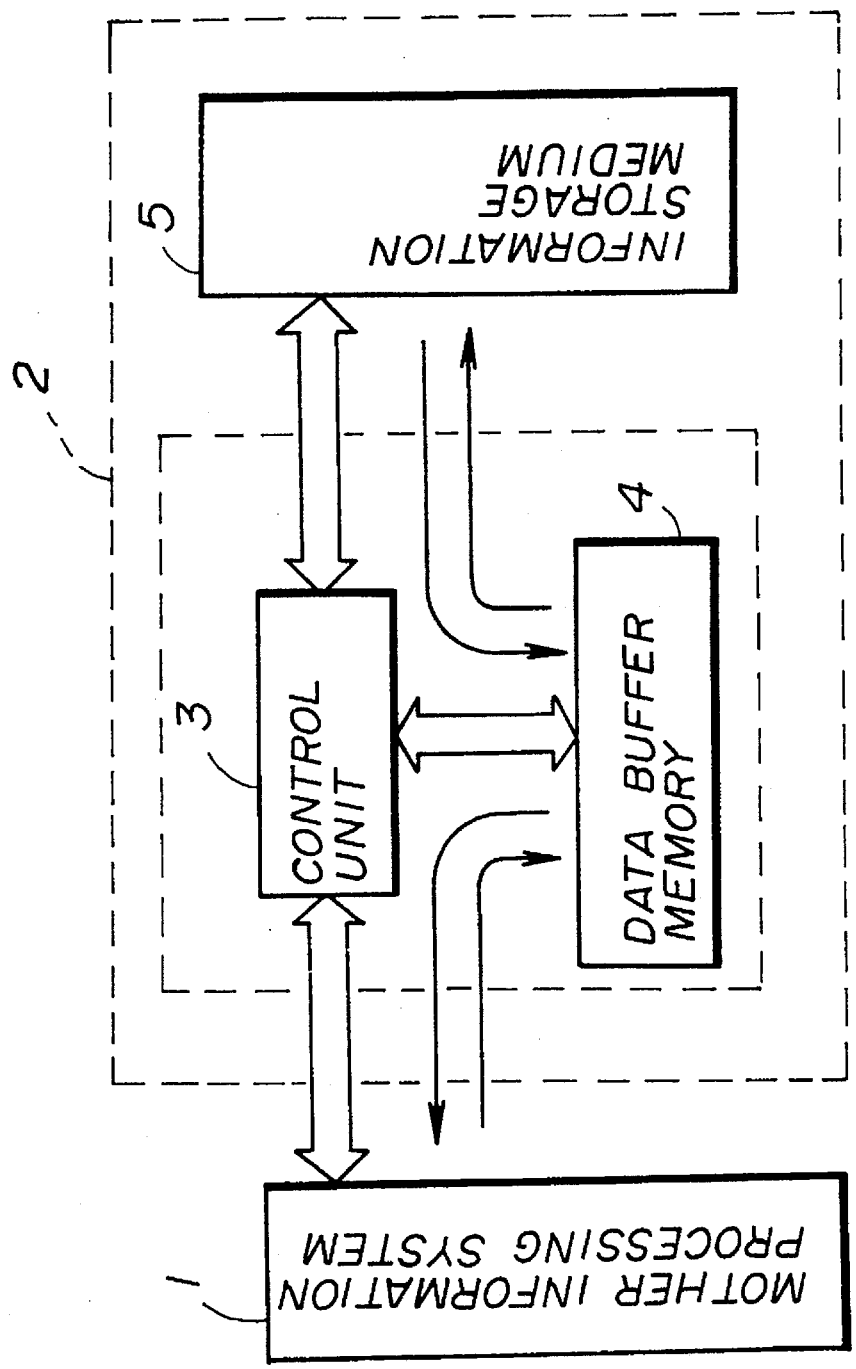

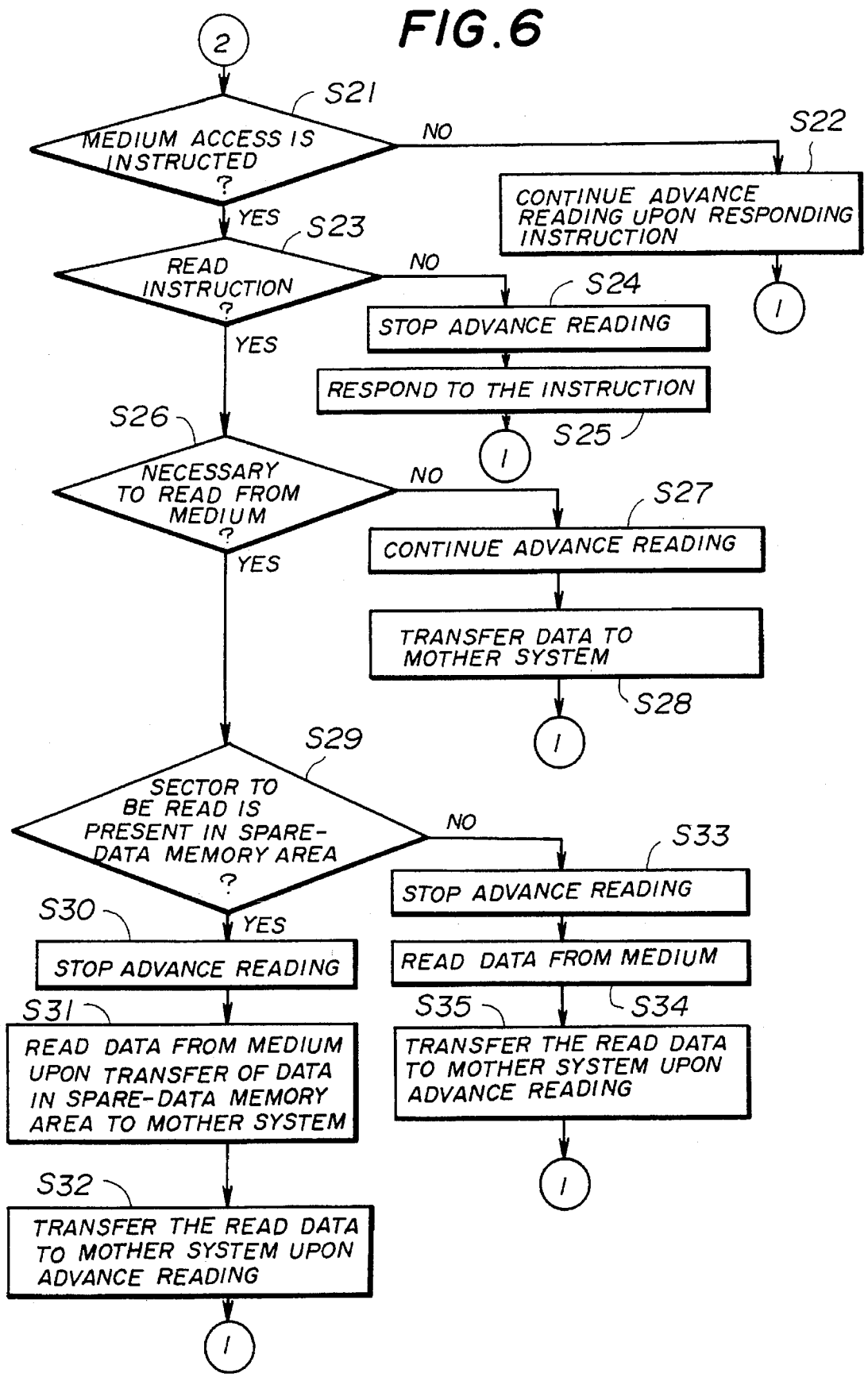

INFORMATION STORAGE SYSTEM HAVING ADVANCE READING FUNCTION

BACKGROUND OF THE INVENTION

1. Field of the Invention

The present invention relates to an information storage system having a high-efficiency information transfer function. The above information transfer function may be an information transfer function for transferring data from an information storage medium such as a magneto-optical disc to a mother information processing system. In particular, the present invention improves an advance reading function previously proposed by the inventor of the present invention so that the advance reading function may be used more effectively.

2. Related Art

An information storage system in the related art includes a control unit for reading data out from a information storage medium and writing data thereinto and a data buffer memory. The control unit, according to an amount of information to be transferred specified by a mother information processing system, transfers data previously stored in the information storage medium using the data buffer memory.

Such an information storage system may be a disc apparatus such as a magneto-optical disc apparatus and constitutes a filing system together with a mother information processing system such as a host adapter including a SCSI.I/F unit.

Such an information storage system in the related art is idle after completing a specified information transfer work until subsequent information is specified by the mother information processing system. Thus, the efficiency of the information storage system is degraded.

The inventor of the present invention has proposed the advance reading function, as mentioned above, used in an information storage system which has also been proposed by the inventor, as an information storage system controller' in Japanese Patent Application No. 4-280671. The proposed advance reading function actively uses an idle time such as that mentioned above generated after the information storage system has completed a specified information transfer work. More particularly, the advance reading function, after the information storage system has completed the specified information transfer work, reads data blocks subsequent to the data blocks which have been transferred in the above specified information transfer work, in advance of subsequent information being specified by the mother information processing system. The advance reading function then stores the thus read data blocks into a spare-data storage memory. Then, if the above mother-system' subsequent specified information includes a work of reading data blocks out from the information storage medium, which data blocks are identical to the data blocks previously stored in the spare-data storage memory as mentioned above, the previously stored data blocks may be transferred to the mother system immediately after the relevant information is specified. Thus, the information processing efficiency may be improved.

However, the information storage system previously proposed by the inventor stops such an advance reading operation immediately after the system receives subsequent information specified by the mother system which does not specify that the same advance reading operation is to be continued, and thus the information storage system performs the work thus specified by the mother system instead of performing the advance reading operation. Thus, the advance reading function may not always be used effectively.

SUMMARY OF THE INVENTION

An object of the present invention is to eliminate the above problem which prevents the advance reading function from always being used effectively.

In order to achieve the object of the present invention, the present invention enables an advance reading function to be used more efficiently by preventing an already started advance reading operation from being unnecessarily stopped as long as it is possible. If subsequent information is specified by the mother system while the advance reading operation is being carried out, the contents of the subsequent specified information are examined first, instead of immediately stopping of the advance reading operation. Then if, as a result of the examination, it is found that the specified information does not include contents whereby it is necessary to immediately stop the advance reading operation, the advance reading operation is continued. That is, if the mother system has requested to transfer data blocks (or sectors of data) already read in the advance reading operation, the read data blocks are transferred to the mother system while the advance reading operation is continued. Further, if the mother-system's subsequent specified information does not include a request to read data from the information storage medium and thus does not include a request to stop the advance reading, the advance reading operation being currently performed is continued.

Thus, the present invention may improve the advance reading function previously proposed by the inventor.

An information storage system according to the present invention comprises:

reading means for reading first data blocks among the data blocks stored in an information storage medium according to information specified by a mother system;

buffering means for temporarily storing said first data blocks read by said reading means;

transferring means for transferring said first data blocks temporarily stored by said buffering means to said mother system;

advancing means for causing, in an advance reading operation, said reading means to read in advance second data blocks subsequent to said first data blocks in said information storage medium, said means then causing said buffer means to store said second data blocks; and controlling means for controlling said advancing means appropriately according to the information specified by said mother system.

Due to the provision of the control means, the advance reading function is controlled according to the specified information so that the advance reading function may be used in the optimum manner.

It is preferable that said controlling means causes said advancing means to continue the advance reading operation if the information specified by said mother system does not indicate that said information storage medium is to be accessed.

Thus, the advance reading function may be used effectively.

It is preferable that said controlling means causes said advancing means to stop the advance reading operation if the information specified by said mother system indicates to access said information storage medium but does not indicate to read data blocks therefrom.

Thus, it is possible for the information storage system to execute the work specified by the mother system specification as if the system did not have such an advance reading function.

It is preferable that said controlling means examines whether or not the data blocks to be read out from said information storage medium according to the information specified by said mother system include the second data blocks already stored by said buffering means.

Due to the provision of the control means, the advance reading function is controlled with the specified information so that the advance reading system may be used in the optimum manner.

It is preferable that, if said controlling means determines that all of the data blocks to be read out from said information storage medium are data blocks of the second data blocks stored by said buffering means, said controlling means causes said advancing means to continue the operation and then causes said transferring means to transfer the specified data blocks, of the second data blocks already stored by said buffering means, to said mother system.

Thus, the advance reading function is effectively used.

It is preferable that, if said controlling means determines that the data blocks to be read out from said information storage medium include data blocks not stored by said buffering means in advance and also include data blocks of the second data blocks already stored by said buffering means, said controlling means causes said advancing means to stop the operation and then causes said reading means to read out said data blocks, not stored by said buffering means in advance, from said information storage medium, the thus read out data blocks being then transferred to said mother system. Further, said controlling means causes said transferring means to transfer the specified data blocks, of the second data blocks already stored by said buffering means, to said mother system.

Thus, the advance reading function may be suitably controlled so that the advance reading function may be effectively used.

It is preferable that, if said controlling means determines that the data blocks to be read out from said information storage medium do not include data blocks of the second data blocks stored by said buffering means, said controlling means causes said advancing means to stop the operation and then causes said reading means to read out said data blocks from said information storage medium, the thus read out data blocks being then transferred to said mother system.

Thus, the advance reading operation is suitably controlled so that the advance reading function may be effectively used.

Other objects and further features of the present invention will become more apparent from the following detailed description when read in conjunction with the accompanying drawings.

BRIEF DESCRIPTION OF THE DRAWINGS

FIG. 1 illustrates an example of a manner of information-storage-medium data formatting used in an information storage system;

FIG. 2 shows a function block diagram including essential function blocks in an information storage system controller in an embodiment of the information storage system according to the present invention;

FIG. 3 shows a structure of a memory which may be used in the controller 2 shown in FIG. 2;

FIG. 6 shows an operation flow chart including essential steps relevant to an advance reading operation in the information storage system according to the present invention.

DESCRIPTION OF THE PREFERRED EMBODIMENTS

Figure 4:
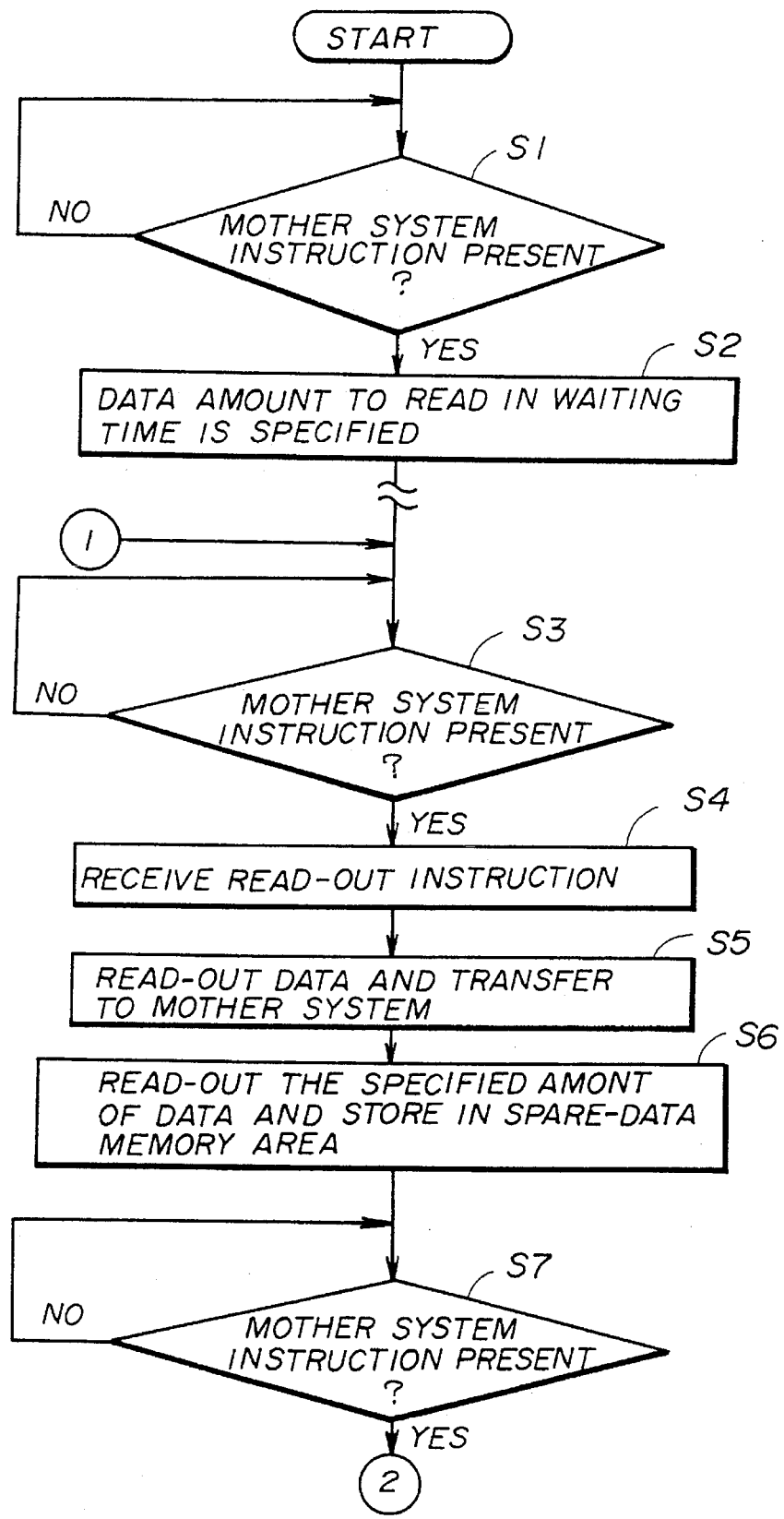
FIGS. 4 and 5 show an operation flow chart including essential steps in a data transfer operation in the information storage system previously proposed by the inventor.

An example of a manner of information-storage-medium data formatting used in an information storage system will now be described with reference to FIG. 1.

As shown in FIG. 1, disposed blocks i, i+1, i+2, . . . are included in an information storage medium, each of the blocks including a block address (ID) area and a data area. Generally speaking, data is stored in the blocks of the information storage medium in the order the blocks are disposed. In an information transfer process, a number of blocks which can be transferred in a single transfer operation is commonly limited. Thus, if the number of blocks requested to be transferred is larger than the number of blocks which it is possible to transfer in a single transfer operation, a plurality of transfer operations are needed to satisfy the request. In such a case, the data consisting of the number of blocks requested to be transferred is separated into a plurality of portions so that each of the data portions will thus be transferred in a respective one of the plurality of transfer operations, successively. In such a case, the mother system may specify the plurality of transfer operations successively, the transfer operations corresponding to the data portions in the order of the block disposition. Thus, it is possible to predict which blocks will be requested, to be read and then transferred according to the subsequent information specified by the mother system.

This is the basis of the advance reading function previously proposed by the inventor. Since it is possible to predict the data blocks which will be requested to be read and then transferred, the advance reading function is effective, in improving the data processing efficiency, to enable the relevant data blocks to be read in advance of a time the relevant information specified by the mother system. The predictable blocks are commonly the blocks subsequent to the blocks which it has been requested be read and then transferred by the current specified information due to the plurality of the transfer operations (specified by the corresponding information) corresponding to the data portions in the order of the data block disposition as described above. Thus, the advance reading function, in advance, reads the blocks subsequent to the blocks which has been already read and transferred in accordance with the corresponding current specified information, then stores the thus in-advance read blocks in a memory.

With reference to FIG. 2, an information storage system controller in an embodiment of the information storage system according to the present invention will now be described.

The information storage system controller 2 is connected to a mother information processing system 1. The information storage system controller 2 includes a control unit 3, a data buffer memory 4 and an information storage medium 5.

In the controller 2, data is transferred from the mother system 1 to the control unit 3, then to the data buffer memory 4, then to the control unit 3, and then to the storage medium 5, when the data output by the mother system 1 is stored into the storage medium 5.

In the controller 2, data is transferred from the storage medium 5 to the control unit 3, then to the data buffer memory 4, then to the control unit 3, and then to the mother system 1, when the data read out from the storage medium 5 is supplied to the mother system 1.

The controller 2 has an advance reading function identical to that previously proposed by the inventor. Thus, the controller 2, after completion of a data transfer operation in which the first series of data blocks is read out from the storage medium 5 and are then transferred to the mother system 2 in accordance with the relevant information specified by the mother system 1, carries out such an advance reading operation. That is, the controller 2 reads a second series of data blocks subsequent to the last block of the first series of data blocks in the storage medium 5 according to the advance reading function. The controller 2 then stores the thus read second series of data blocks into the data buffer memory 4 or the like.

If the controller 2 receives subsequent information specified by the mother system 1 during the above advance reading operation, the controller 2 controls the current advance reading operation appropriately in accordance with the above subsequent specified information after examining the contents of the information.

The controller 2 continues the current advance reading operation if the above subsequent information does not indicate to access the information storage medium 5. The operation controlled according to the specified information is performed by the controller 2 in parallel with the above advance reading operation.

The controller 2 stops the current advance reading operation if the above subsequent specified information indicates to access the information storage medium 5 but does not indicate to read data blocks therefrom. In this case, the controller 2 performs the operation according to the specified information instead of performing the above advance reading operation.

The controller 2 examines whether or not the data blocks to be read out from the information storage medium 5 according to the above subsequent specified information include the second data blocks already read and then stored into the memory 4 in the current advance reading operation.

The controller 2, if all of the data blocks to be read out from the information storage medium 5 are data blocks of the second data blocks already stored in the memory 4 according to the results of the above examination, thus continues the current advance reading operation and then transfers the specified data blocks of the second data blocks already stored in the memory 4 to the mother system 1.

The controller 2, if the data blocks to be read out from the information storage medium 5 include data blocks which have not been stored in the memory 4 in the current advance reading operation and also include data blocks of the second data blocks already stored into the memory 4 in the current advance reading operation, according to the results of the above examination, stops the current advance reading operation and then reads out the data blocks, which have not been stored in the memory in the current advance reading operation, from the information storage medium 5, the thus read out data blocks being then transferred to the mother system 1. The controller 2 also transfers the specified data blocks of the second data blocks already stored in the memory 4 in the current advance reading operation to the mother system 1. Then, after the completion of the above reading operation, the controller 2 carries out another advance reading operation, that is, reading of the data blocks subsequent to the last block of the data blocks which have been read in the above reading operation.

If the data blocks to be read out from the information storage medium 5 do not include data blocks of the second data blocks already stored into the memory 4 in the current advance reading operation, the controller 2 stops the current advance reading operation and then reads out the specified data blocks from the information storage medium 5, the thus read out data blocks being then transferred to said mother system 1. Then, after the completion of the above reading operation, the controller 2 carries out another advance reading operation, that is, reading the data blocks subsequent to the last block of the data blocks which have been read in the above reading operation.

A structure of a memory which may be used as the data buffer memory 4 shown in FIG. 2 will now be described with reference to FIG. 3. The memory includes a data buffer memory area 4a and a spare-data memory area 4b.

As shown in the figure, the information storage system according to the present invention uses not only the data buffer memory area 4a but also the spare-data memory area 4b. The memory area 4a acts as a memory which is also used in the information storage system in the related art. The memory area 4a temporarily stores data which is transferred between the mother information processing system 1 and the information storage medium 5 those shown in FIG. 2. The spare-data memory area 4b stores data which is read out from the storage medium 5 particularly in the advance reading operation.

In order to use the two memory areas separately as described above, it is necessary to previously separate the memory into the two areas.

In the advance reading operation, data is read out from the storage medium 5 and transferred to the mother system 1 via the spare-data memory area 4b. Thus, the spare-data memory area 4b acts as an intermediate buffer in the data transfer operation.

With reference to FIG. 2, if the controller 2 receives reading-out instructions from the mother system 1, the control unit 3 reads out data from the storage medium 5 according to the received instructions. Then, if the instructed reading out operation has been completed, the controller 2 reports to the mother system 1 the operation completion.

The control unit 3 internally reads out information blocks from the storage medium 5 subsequent to the last information block of the information blocks which have been read out according to the above instructions given by the mother system 1. This internal reading-out operation is automatically carried out under the condition where no instructions are given to the controller 2 from the mother system 1 to perform this operation. The thus read out blocks are then stored in the spare-data memory area 4b of the memory 4.

If other reading-out instructions are given to the controller 2 from the mother system 1, the control unit 3 checks whether or not the information blocks which should be read out according to the instructions are present in the spare-data memory area 4b.

If the relevant information blocks are present in the memory area 4b, the control unit 3 transfers the blocks to the mother system 1. If there are information blocks which should be transferred to the mother system according to the above instructions but are not present in the spare-data memory area 4b, the control unit 3 reads out the blocks from the storage medium 5 and transfers them to the mother system via the data buffer memory area 4a.

The above-described advance reading function according to the previously proposed system as described above will now be described with reference to FIGS. 4 and 5. The controller 2 in the embodiment of the present invention uses the same steps S1 through S7, shown in FIG. 4, as those which the previously proposed system uses. Further, the controller 2 uses other steps which will be described with reference to FIG. 6.

With reference to FIG. 4, in a step (the term step will be omitted from hereon) S1, the control unit 3 waits for an instruction to be given by the mother system 1.

After an instruction has been given, a data amount to be read out from the storage medium 5 during a time in which the control unit 3 waits for another instruction is specified by the mother system 1 in S2.

Then, the control unit 3 waits for another instruction to be given by the mother system 1.

After another instruction has been given by the mother system 1, the control unit 3 receives a reading-out instruction in S4.

Then, in S5, the control unit 3 reads out the data from the storage medium 5 according to the above reading-out instruction and then transfers the thus read-out data to the mother system 1.

Then, in S6, the control unit 3 reads out from the storage medium 5 the above specified amount of data starting from the block subsequent to the last blocks of the information blocks which have been read out in S5. The control unit 3 stores the thus read-out data into the spare-data memory area 4b.

The control unit 3 waits for another instruction in S7.

Figure 5:
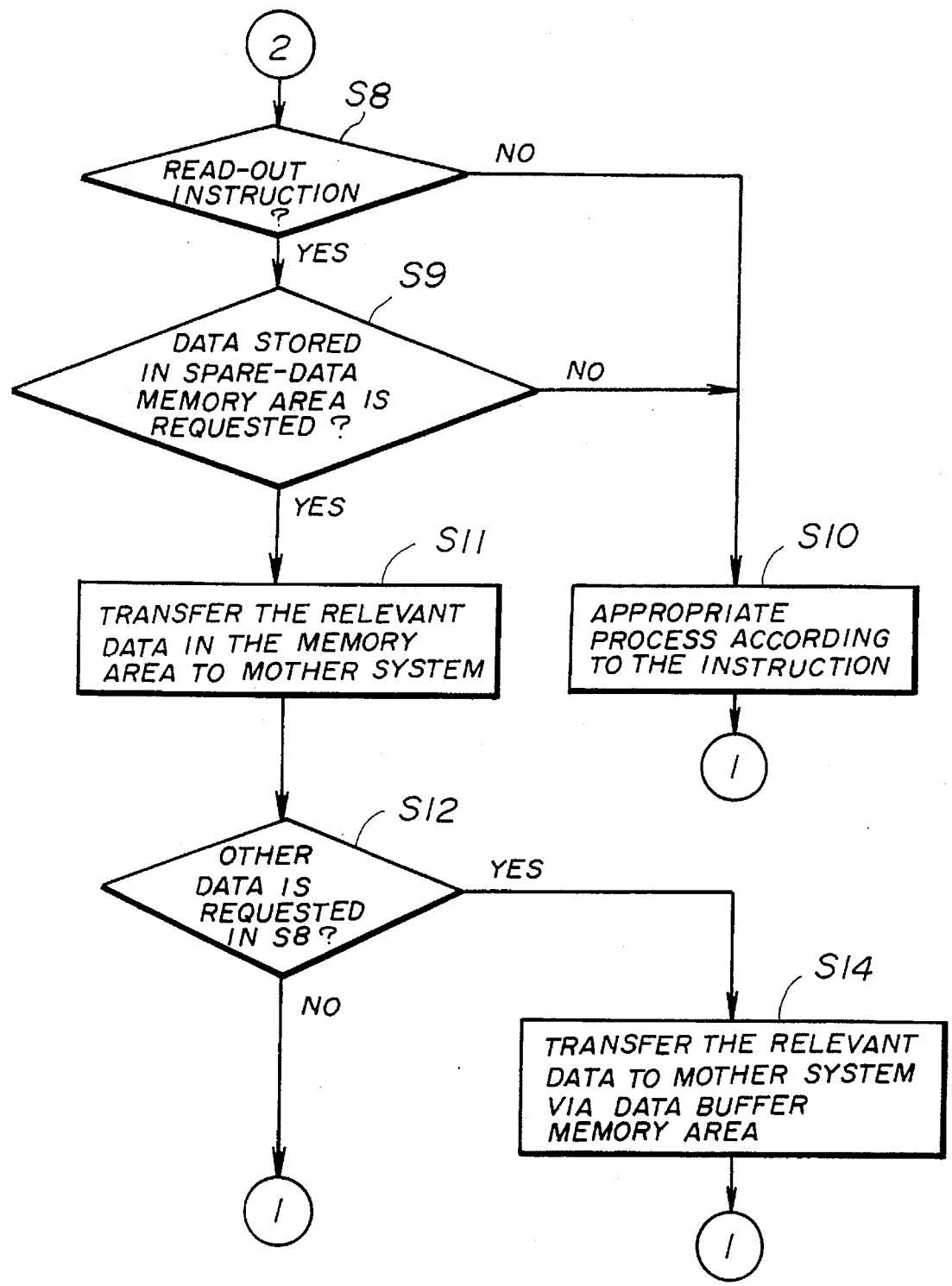

After the control unit 3 has received another instruction from the mother system 1, the control unit 3 determines whether or not the thus received instruction is a reading-out instruction in S8 shown in FIG. 5.

If the current instruction is not a reading-out instruction in S8, the control unit 3 carries out the appropriate process according to the current instruction in S10, the control unit 3 then returning to S3.

If the current instruction is a reading-out instruction in S8, the control unit 3 checks whether or not the data to be transferred to the mother system 1 according to the reading-out instruction is one which has been stored in the spare-data memory area 4b in S9.

If the above data to be transferred is not one previously stored in the memory area 4b in S9, the control unit 3 carries out the appropriate process according to the above reading-out instruction, that is, reading out the above data from the storage medium 5 and transferring the read-out data to the mother system 1. Then, the control unit 3 returns to S3.

If the above data to be transferred includes one previously stored in the memory area 4b in S9, the control unit 3 reads out the relevant data from the memory area 4b and transfers it to the mother system, in S14.

The control unit 3 then determines in S12 whether or not the above data to be transferred also includes one which has not been stored in the spare data memory area 4b.

If the above data includes one not previously stored in the memory area 4b in S12, the control unit 3 reads out the relevant data from the storage medium 5, stores it in the data buffer memory area 4a, and then transfer it to the mother system 1, in S14.

Then, the control unit 3 returns to S3 and waits for another instruction to be given by the mother system 1.

If the above data to be transferred does not include data which has not been stored in the spare-data memory area 4b in S12, the control unit 3 returns to S3 and waits for another instruction to be given by the mother system 1.

Thus, by S1 through S14, the controller 2 in the embodiment of the present invention reads out the data according to a reading-out instruction given by the mother system 1 and transfers the data to the mother system 1. Then, the controller 2 further reads out the subsequent data from the storage medium 5 automatically and stores it in the spare-data memory area 4b. Then, the data stored in the spare-data memory area 4b is immediately transferred to the mother system 1 if the same data is requested in a reading-out instruction given by the mother system 1.

The controller 2 performs processes as will be described now with reference to FIG. 6, if an instruction given by the mother system 1 is received by the controller 2 in the course of the advance reading operation, such as in S6 shown in FIG. 4.

As described above, the procedure shown in FIG. 4 used by the above-described previously proposed system is the same as that used by the controller 2 in the embodiment of the present invention. The control unit 3 carries out the determination in S7 in the course of S6, the advance reading operation. The procedure shown in FIG. 6 is executed if S7 determines that an instruction is given in the course of S6.

Then, the control unit 3 checks the contents of the above instruction so as to determine whether or not the instruction indicates to access the storage medium 5, in S21 shown in FIG. 6.

If the above instruction does not indicate accessing of the storage medium 5 in S21, the control unit 3 carries out the appropriate process according to the instruction as if no advance reading operation were being carried out, simultaneously continuing the advance reading operation actually, in S22. Then, the control unit 3 returns to S3 and waits for another instruction to be given by the mother system 1.

If the above instruction indicates to access the storage medium 5 in S21, the control unit 3 determines in S23 whether or not the relevant instruction is a reading instruction.

If it is not a reading instruction in S23, the control unit 3 stops the advance reading operation in S24 and then carries out the process according to the instruction in S25. Then, the control unit 3 returns to S3 and waits for another instruction to be given by the mother system 1.

If the relevant instruction is a reading instruction in S23, the control unit 3 determines in S26 whether or not the reading instruction indicates to read out either data which has not been stored in the spare-data memory area 4b or data which is being stored there in the advance reading operation currently being carried out.

If the reading instruction indicates to read out data previously stored or now being stored in the memory area 4b in S26, the control unit 3 continues the advance reading operation in S27 and transfers the relevant data of the data which has been stored in the spare-data memory area 4b to the mother system 1 in S28.

If the reading instruction indicates to read out data neither previously stored nor now being stored in the memory area 4b in S26, that is, it is necessary to read out data even though the advance reading operation is currently being carried out, the control unit 3 carries out S29. In S29, the control unit 3 determines whether or not the data transfer which has been requested by the mother system 1 includes data (sectors of data) which has been stored in the spare-data memory area 4b.

If the relevant data includes the data in the memory area 4b in S29, the control unit 3 stops the advance reading operation in S30 and reads out the data from the storage medium 5 which is that part of all of the requested data not previously stored in the memory area 4b simultaneously with the transferring of the remaining part of all of the requested data present in the memory area 4b to the mother system 1. Then, in S32, the control unit 3 carries out another advance reading operation simultaneously with the transferring of the data read out in S31 to the mother system 1.

If none of the requested data includes data present in the spare-data memory area 4b in S29, the control unit 3 stops the advance reading operation in S33 and reads out the relevant requested data from the storage medium 5.

Then, in S35, the control unit 3 carries out another advance reading operation simultaneously with the transferring of the data read out in S31 to the mother system 1. Then, the control unit 3 returns to S3 and waits for another instruction to be given by the mother system 1.

Summarizing the above, by S21 through S35 together with S1–S7 shown in FIG. 4, even if an instruction given by the mother system 1 is received by the controller 2 in the course of the advance reading operation, it is not always necessary to stop the advance reading operation and the advance reading operation can be appropriately controlled depending on the contents of the above instruction.

It is also possible in the embodiment of the present invention to use S8–S14 shown in FIG. 5 in addition to S1–S7 and S21–S35. In this case, as described above, the procedures S21–S35 are carried out when an instruction is received by the controller 2 while the advance reading operation is being carried out. On the other hand, the procedures S8–S14 are carried out when an instruction is received by the controller 2 after the relevant advance reading operation has been completed.

Further, the present invention is not limited to the above described embodiments, and variations and modifications may be made without departing from the scope of the present invention.

What is claimed is:

1. An information storage system comprising:
   reading means for reading first data blocks among the data blocks stored in an information storage medium in response to information specified by a mother system;
   buffering means for temporarily storing said first data blocks read by said reading means;
   transferring means for transferring said first data blocks temporarily stored by said buffering means to said mother system;
   advancing means for causing, in an advance reading operation, said reading means to read in advance second data blocks subsequent to said first data blocks in said information storage medium, said means then causing said buffer means to store said second data blocks; and
   controlling means for controlling said advancing means, said controlling means being configured to process the information specified by said mother system, and to determine an operation to be performed during advance reading operation in response to the information specified by said mother system, wherein said operation includes causing said advancing means to continue the advance reading operation or to discontinue the advance reading operation.

2. The information storage system according to claim 1, wherein said controlling means causes said advancing means to continue the advance reading operation if the information specified by said mother system does not indicate to access said information storage medium.

3. The information storage system according to claim 1, wherein said controlling means causes said advancing means to discontinue the advance reading operation if the information specified by said mother system indicates to access said information storage medium but does not indicate to read data blocks therefrom.

4. The information storage system according to claim 1, wherein said controlling means examines whether or not the data blocks to be read out from said information storage medium according to the information specified by said mother system include the second data blocks already stored by said buffering means.

5. The information storage system according to claim 4, wherein if said controlling means determines that all of the data blocks to be read out from said information storage medium are data blocks of the second data blocks stored by said buffering means, said controlling means causes said advancing means to continue the advance reading operation and then causes said transferring means to transfer the specified data blocks, of the second data blocks already stored by said buffering means, to said mother system.

6. The information storage system according to claim 4, wherein if said controlling means determines that the data blocks to be read out from said information storage medium include data blocks not stored by said buffering means in advance and also include data blocks of the second data blocks already stored by said buffering means, said controlling means causes said advancing means to discontinue the advance reading operation and then causes said reading means to read out said data blocks, not stored by said buffering means in advance, from said information storage medium, the thus read out data blocks then being transferred to said mother system, and also causes said transferring means to transfer the specified data blocks, of the second data blocks already stored by said buffering means, to said mother system.

7. The information storage system according to claim 4, wherein if said controlling means determines that the data blocks to be read out from said information storage medium do not include data blocks of the second data blocks stored by said buffering means, said controlling means causes said advancing means to discontinue the advance reading operation and then causes said reading means to read out the specified data blocks from said information storage medium, the thus read out data blocks then being transferred to said mother system.

8. An information storage system comprising:
   reading means for reading first data blocks among the data blocks stored in an information storage medium in response to information specified by a mother system;
   buffering means for temporarily storing said first data blocks temporarily read by said reading means;
   transferring means for transferring said first data blocks temporarily stored by said buffering means to said mother system;
   advancing means for causing, in an advance reading operation, said reading means to read in advance second data blocks subsequent to said first data blocks in said information storage medium, said means then causing said buffer means to store said second data blocks; and
   controlling means for controlling said advancing means, said controlling means being configured to process the information specified by said mother system, and to determine an operation to be performed during the advance reading operation in response to the information specified by said mother system, such that when the information specified by said mother system causes said reading means to read said first data blocks and said buffering means to store said first data blocks, said controlling means controls said advancing means to cause said reading means to continuously read in said advance reading operation said second data blocks and said buffer means to continuously store said second data blocks.

* * * * *